(12) United States Patent
Pon et al.

(10) Patent No.: US 6,272,343 B1
(45) Date of Patent: Aug. 7, 2001

(54) METHOD AND APPARATUS FOR FAST SIGNAL ACQUISITION OF PREFERRED WIRELESS CHANNEL

(75) Inventors: Rayman W. Pon, Cupertino; Huihung Tim Lu, Danville, both of CA (US)

(73) Assignee: Tellus Technology, Inc., Fremont, CA (US)

( * ) Notice: Subject to any disclaimer, the term of this patent is extended or adjusted under 35 U.S.C. 154(b) by 0 days.

(21) Appl. No.: 09/172,335

(22) Filed: Oct. 13, 1998

(51) Int. Cl.[7] ........................................................ H04Q 7/20
(52) U.S. Cl. .................. 455/434; 455/161.2; 455/161.3; 455/186.1
(58) Field of Search .................................... 455/432, 434, 455/515, 525, 62, 552, 553, 551, 161.1, 161.2, 161.3, 166.1, 166.2, 179.1, 185.1, 186.1, 186.2

(56) References Cited

U.S. PATENT DOCUMENTS

| | | | |
|---|---|---|---|
| 5,257,400 | * 10/1993 | Yoshida | 455/434 |
| 5,276,905 | * 1/1994 | Hurst et al. | 455/62 |
| 5,428,666 | * 6/1995 | Fyfe et al. | 455/551 |
| 5,442,806 | * 8/1995 | Barber et al. | 455/551 |
| 5,586,338 | * 12/1996 | Lynch et al. | 455/434 |
| 5,590,397 | * 12/1996 | Kojima | 455/186.1 |
| 5,937,351 | * 8/1999 | Seekins et al. | 455/434 |
| 5,983,115 | * 11/1999 | Mizikovsky | 455/434 |
| 6,011,960 | * 1/2000 | Yamada et al. | 455/434 |
| 6,075,988 | * 6/2000 | Anderson et al. | 455/434 |

\* cited by examiner

*Primary Examiner*—Lester G. Kincaid
(74) *Attorney, Agent, or Firm*—Boris G. Tankhilevich

(57) ABSTRACT

An apparatus and method for fast signal acquisition on a preferred communication channel is disclosed. The apparatus includes a frequency and identification guidance system that can have a hardware as well software implementation. The memory of the device includes a prioritized multi-level system of channels and a prioritized multi-level system of identifiers. The frequency and identification guidance system utilizes both multi-level systems to guide the device to a channel belonging to the preferred Service Provider.

1 Claim, 4 Drawing Sheets

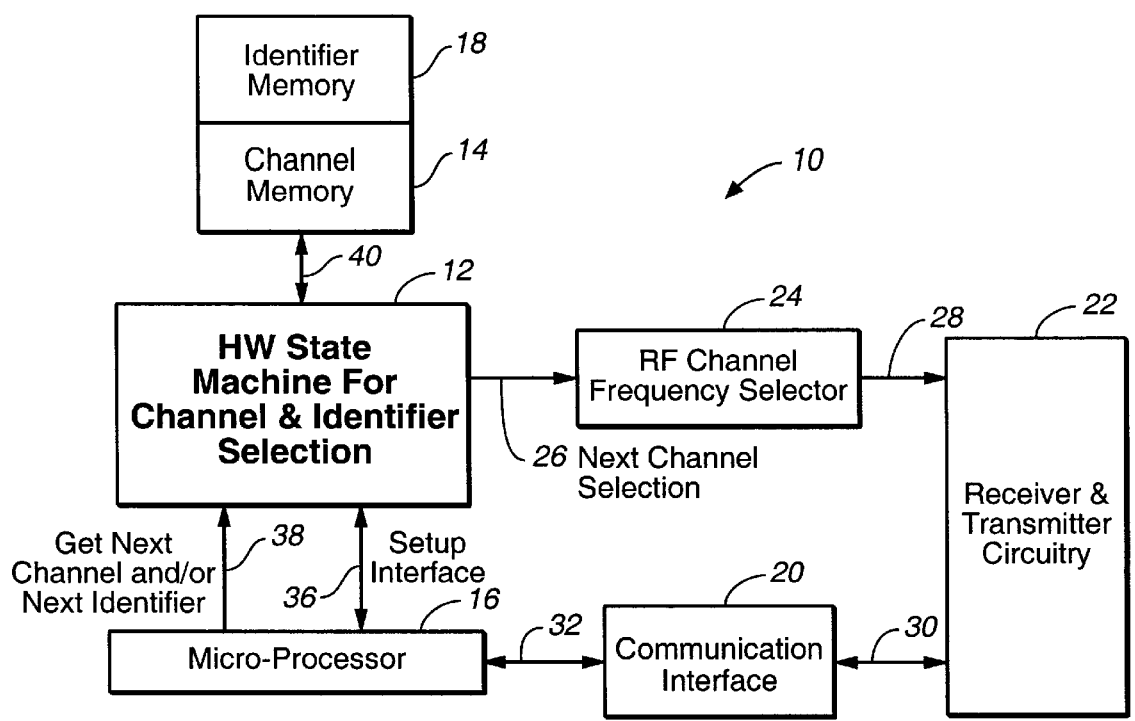
FIG._1
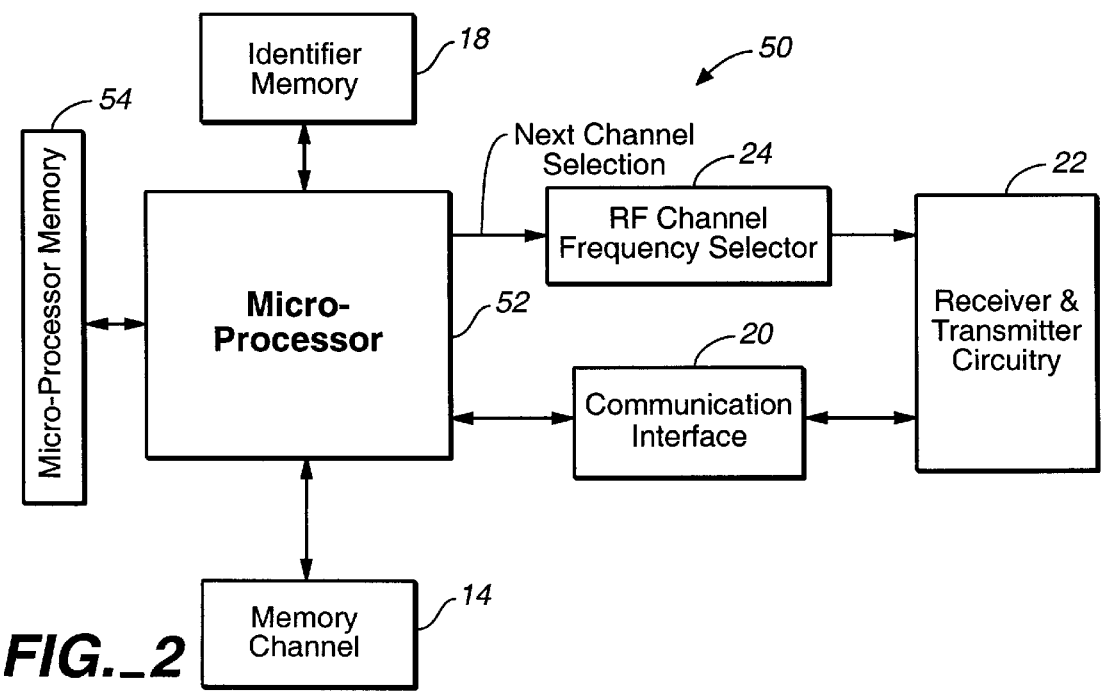
FIG._2

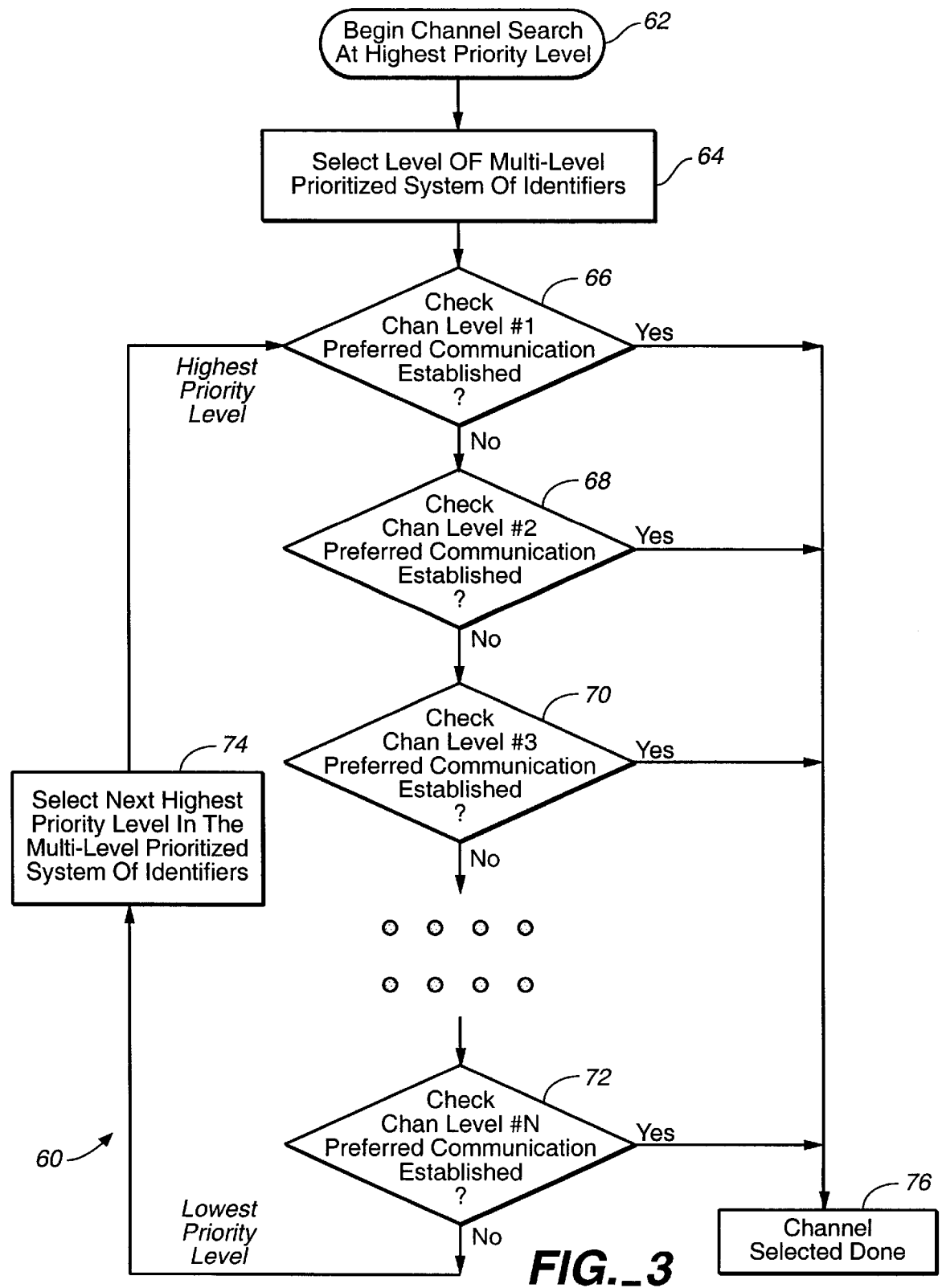
FIG._3

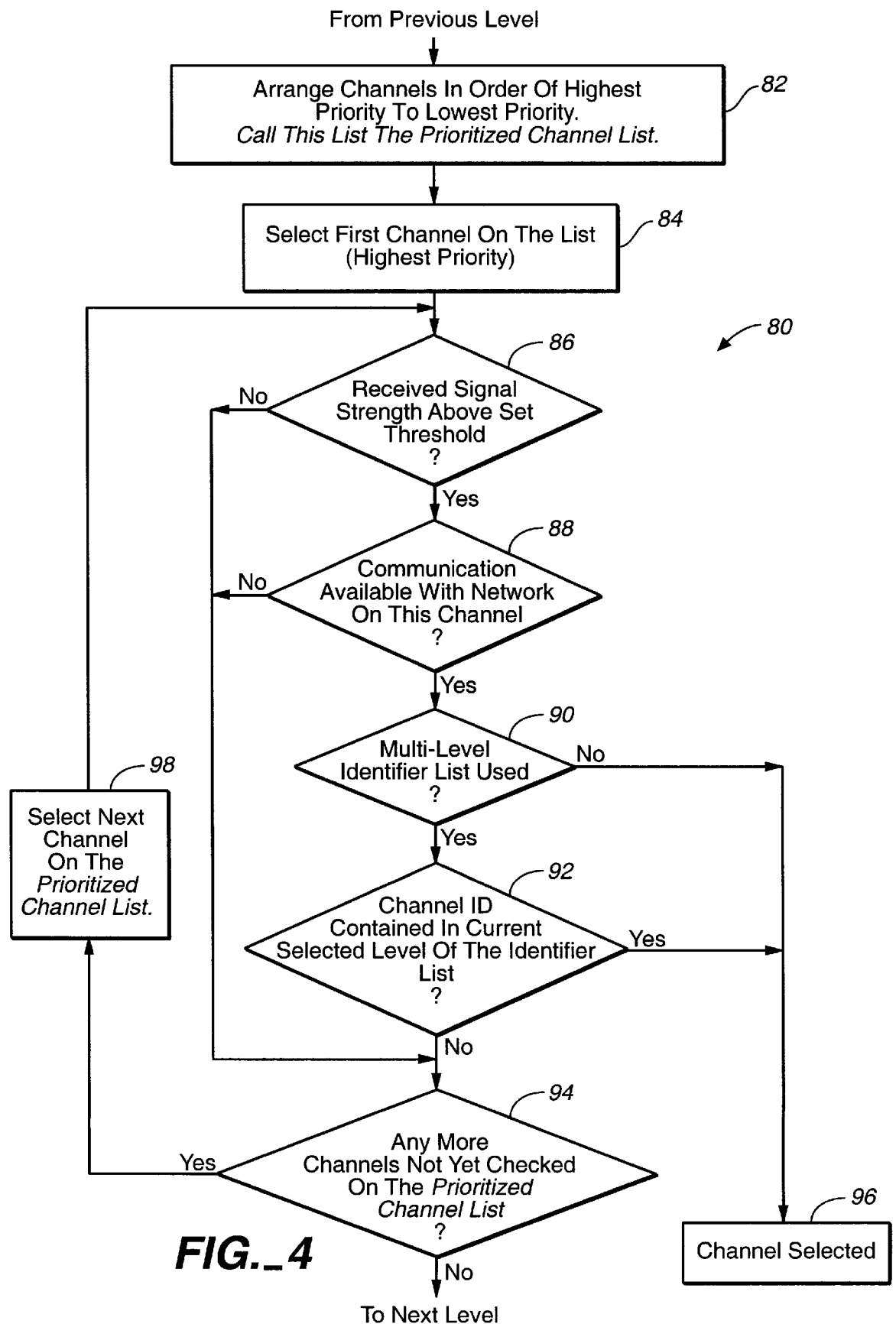
FIG._4

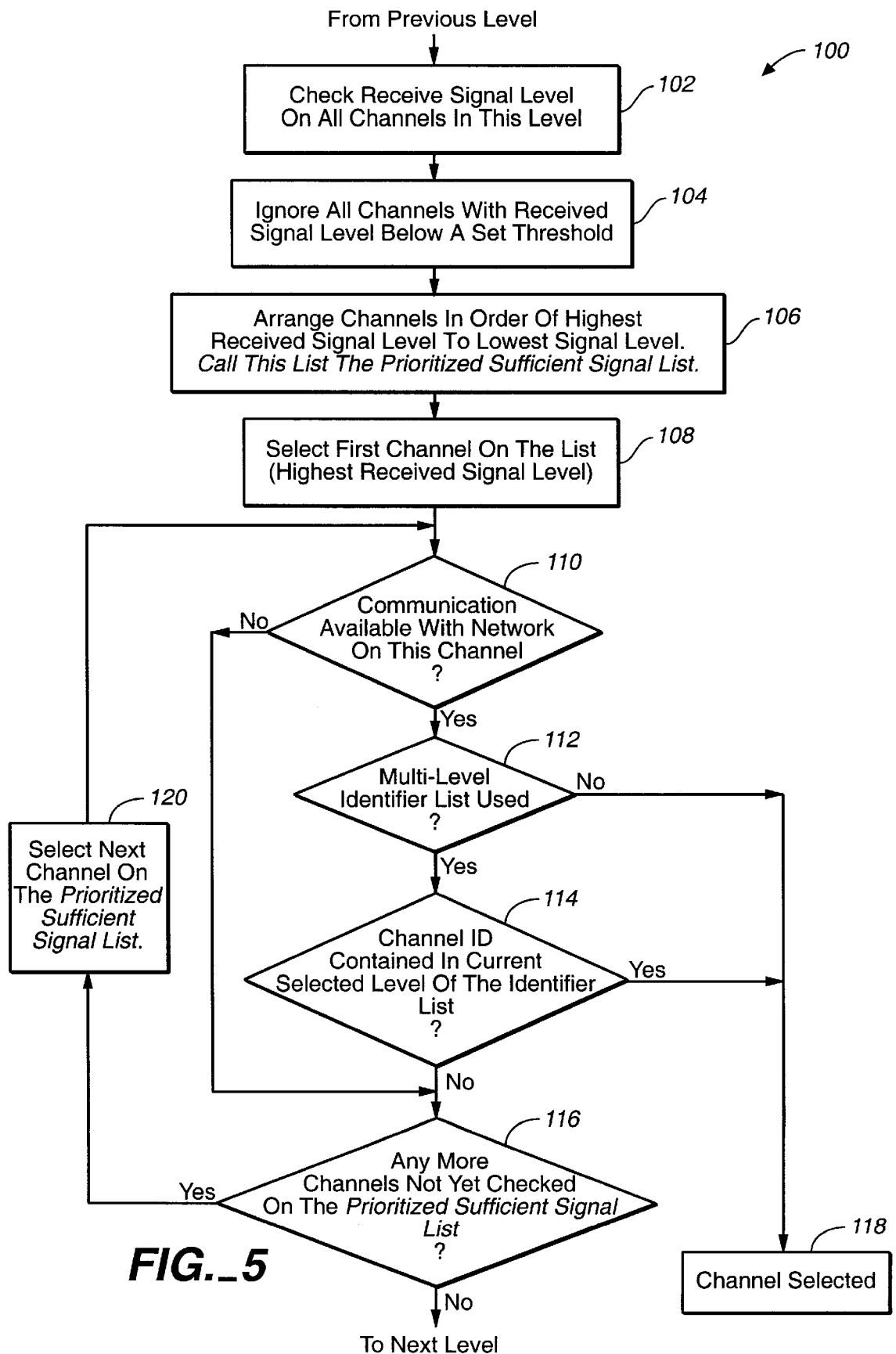
FIG._5

METHOD AND APPARATUS FOR FAST SIGNAL ACQUISITION OF PREFERRED WIRELESS CHANNEL

BACKGROUND

The demand for ubiquitous personal communications is driving the development of new networking techniques that accommodate mobile voice and data users who move throughout buildings, cities or countries. The cellular system is responsible for providing coverage throughout a particular territory, called a coverage region or market. The interconnection of many such systems defines a wireless network capable of providing service to mobile users throughout a country or continent.

To provide wireless communications within a particular geographic region, an integrated network of base stations should be deployed to provide sufficient radio coverage to all mobile users. The base stations, in turn, should be also connected to a central hub called the mobile switching center (MSC). The MSC provides connectivity between all of the wireless subscribers in a system.

As compared with the local, fixed telephone network, where all end-users are static, a wireless communications system is extremely complex. The wireless network requires an air interface between base stations and subscribers to provide communications under a wide range of propagation conditions and for any possible user location. To assure adequate area coverage, the deployment of many, sometimes hundreds, of base stations throughout a market is necessary, and each of these base stations should be connected to the MSC. Furthermore, the MSC should eventually provide connection for each of the mobile users to a base station. This requires simultaneous connections to the local exchange carrier (LEC), to one or more interexchange carriers (IXCs), and to other MSCs via a separate cellular signaling network.

For efficient utilization of the radio spectrum, each service provider may employ a variety of channel assignment strategies that can be classified as either fixed or dynamic. In a dynamic channel assignment strategy, the channels are not allocated to a cell on a permanent basis. Instead, the allocation of a channel may follow an algorithm that takes into account the likelihood of future blocking within the cell, the frequency of use of the candidate channel, the reuse distance of the channel, and other cost functions.

In many publicly available wireless communication today, such as cellular, Cellular Digital Packet Data (CDPD), Global System for Mobile users (GSM), Personal Communication Service (PCS), wireless Internet, etc, users are able to access the desired information though networks operated by or coordinated through Service Providers. Service Providers often build, operate, and maintain these networks, but this is not always the case. Service Providers may provide the wireless access for customers, purchase or lease the network access from others, or sub-contract out the network access to others.

There are usually several Service Providers to choose from for a particular wireless communication type. A typical user can select one provider and obtain most of his wireless service needs through that provider. This user selected Service Provider is referred to as the preferred Service provider for the customer.

In those instances where the preferred Service provider is either unavailable or unreachable at the time of access, the customer can gain access to the network to get the desired information, but through a non-preferred Service Provider. When access to the information is obtained through a non-preferred Service provider, the extra charges (for instance, roaming charges) are often incurred. The extra charges are charged above and beyond the normal costs that the customer expects when accessing through a preferred Service Provider. The extra-charges are assessed by the non-preferred Service Provider for usage of their networks and are due to the fact that the user did not select the non-preferred Service Provider as his preferred Service provider.

When a customer has gained access to the information through a non-preferred Service Provider, there are many disadvantages to both the customer and to the preferred Service Provider for this particular customer.

1. Possible roaming charges. These charges are imposed by the non-preferred Service Provider for usage of their networks. The roaming charges can be quite excessive.
2. Preferred Service Provider network is not fully used by its own customers, leading to its less efficient overall usage.
3. There is a quality of service issue when a customer is not using his preferred Service Provider.
4. There is a consistency of service issue when a customer is not using his preferred Service Provider.

A customer may be forced to access the information through a non-preferred Service Provider even when a preferred Service Provider is available.

EXAMPLE 1

1. Both preferred and non-preferred Service Provider are available, but the non-preferred Service Provider has a higher signal strength than the preferred Service Provider at the time of connection.
2. The last channel connected was a non-preferred Service Provider channel and the wireless communication device has a history list which has a last-in-highest-priority scheme giving the last connected channel the highest priority. If both the preferred and the non-preferred Service Providers are available, the non-preferred Service Provider will be selected because it has a highest priority.

What is needed is a method and apparatus for fast signal acquisition on a channel belonging to a preferred Service Provider when it is available.

SUMMARY

The present invention is novel and unique because it discloses a method and apparatus for fast signal acquisition on a channel belonging to a preferred Service Provider when it is available.

One aspect of the present invention is directed to an apparatus for wireless communication comprising: (a) an internal radio receiver and transmitter circuitry; (b) a memory; and (c) a frequency and identification guidance system. The frequency and identification guidance system is configured to select a preferred frequency channel provided by a plurality of networks of external radio transceivers.

In one embodiment, the memory (b) further includes: (b1) a channel memory configured to store a first main list comprising a multi-level system of channels; and (b2) an identifier memory configured to store a second main list comprising a multi-level system of identifiers configured to identify a preferred network of external radio transceivers.

In one embodiment, the frequency and identification guidance system (c) further comprises: (c1) a hardware state machine.

In this embodiment, the apparatus for wireless communication further comprises: (d) a communication interface connected to the internal radio receiver and transmitter circuitry; (e) a microprocessor configured to receive the signal strength and the identifier information from the network of external radio transceivers; and (f) a radio frequency (RF) channel frequency selector.

The internal radio receiver and transmitter circuitry is initially locked into a frequency channel and is configured to receive a signal strength and an identifier information for the locked frequency channel provided by a network of external radio transceivers.

In this embodiment, the hardware state machine under the control of the microprocessor goes through the main first list provided by the channel memory and goes through the main second list provided by the identifier memory in order to select a channel identification (ID) corresponding to a preferred frequency channel. The RF channel frequency selector translates the preferred channel ID to a preferred physical frequency, and the internal radio receiver and transmitter circuitry changes its lock from the initial channel into the channel corresponding to the preferred physical frequency.

In another embodiment, the frequency and identification guidance system (c) further comprises: (c1) a microprocessor; (c2) and a microprocessor memory.

In this embodiment, the apparatus for wireless communication further comprises: (d) a communication interface connected to the internal radio receiver and transmitter circuitry; and (e) an RF channel frequency selector.

The internal radio receiver and transmitter circuitry is initially locked into a frequency channel and is configured to receive a signal strength and an identifier information for the initially locked frequency channel provided by a network of external radio transceivers.

In this embodiment, the microprocessor connected to the communication interface is configured to receive the signal strength and the identifier information from the network of external radio transceivers. The microprocessor goes through the main first list provided by the channel memory and goes through the main second list provided by the identifier memory both included in the main processor memory in order to select a preferred channel ID corresponding to a preferred frequency channel. The RF channel frequency selector translates the preferred channel ID into a preferred physical frequency, and the internal radio receiver and transmitter circuitry changes its lock from the initial physical frequency into the preferred physical frequency.

In one embodiment, the first main list further includes a plurality of N levels with different priority, wherein N is an integer greater or equal to one.

To achieve the preferred connection, a level with the 1-st highest priority is checked first, a level with the 2-nd highest priority is checked second, and each level with the i1-th priority is consecutively checked, wherein "i1" is an integer greater than two and less than or equal to N.

In one embodiment, the second main list further includes a plurality of K levels with different priority, wherein K is an integer greater or equal to one.

To identify a preferred network of external radio transceivers, a level with the 1-st highest priority is checked first, a level with the 2-nd highest priority is checked second, and each level with the i2-th priority is consecutively checked, wherein "i2" is an integer greater than two and less than or equal to K.

Another aspect of the present invention is directed to a method for fast signal acquisition on a preferred wireless frequency channel by a wireless communication apparatus, wherein the wireless communication apparatus includes a memory and a frequency and identification guidance system.

In one embodiment, the method comprises the following steps: (1) configuring the frequency and identification guidance system; and (2) selecting the preferred wireless frequency channel by utilizing the frequency and identification guidance system.

In the preferred embodiment, the step of configuring the frequency and identification guidance system further includes the steps of storing a multi-level system of channels in a first main list of the memory, and storing a multi-level system of identifiers in a second main list of the memory.

In one embodiment, the step of selecting the preferred wireless frequency channel further includes the steps of: (a) selecting a highest priority level in the multi-level system of identifiers; (b) checking a channel level with the 1-st highest priority including a first plurality of channels to achieve the preferred connection; (c) if a preferred connection is not achieved in the step (b), checking a channel level with the 2-nd highest priority including a second plurality of channels to achieve preferred connection; (d) if a preferred connection is not achieved in the step (c), checking consecutively each channel level with the i3-th priority including an i3-th plurality of channels to achieve preferred connection, i3 is an integer greater than two and less than or equal to N; (e) if a preferred connection is not achieved, selecting the next highest priority level in the multi-level system of identifiers; and (f) repeating the steps (b–e).

In one embodiment, the step of selecting the preferred wireless frequency channel further includes the steps of: (a) checking an identifier level with the 1-st highest priority including a first plurality of identifiers to identify a preferred network of external radio transceivers; (b) if a preferred connection is not achieved in the step (a), checking an identifier level with the 2-nd highest priority including a second plurality of identifiers to identify a preferred network of external radio transceivers; and (c) if a preferred connection is not achieved in the step (b), checking consecutively each level with the i4-th priority including an i4-th plurality of identifiers to identify a preferred network of external radio transceivers, i4 is an integer greater than two and less than or equal to K.

In one embodiment, the step of checking the channel level with the next highest priority if a preferred connection is not achieved in the preceding step further comprises the steps of: (a) arranging at the channel level with the next highest priority a plurality of channels in order of highest channel priority to lowest channel priority and marking the arrangement of channels as a prioritized channel list; (b) selecting a channel with the highest channel priority on the prioritized channel list; (c) checking whether the strength of the received signal on the selected channel is above a threshold; (d) checking whether communication is available on the selected channel; (e) confirming the selected channel if the second main list including a multi-level system of identifiers is not used; (f) confirming the selected channel if the second main list including the multi-level system of identifiers is used and if the selected level of identifiers in the second main list includes the identifier provided by a network of external radio transceivers during the communication step (d); (g) selecting a channel with the next highest channel priority on the prioritized channel list if no channel is confirmed; and (h) repeating the steps (c–g).

In one embodiment, all channels within the same channel level have the same channel priority. In this embodiment, the step of checking the channel level if a preferred connection is not achieved at the preceding channel level further comprises the steps of: (a) checking whether the received signal strength is above a signal strength threshold on all channels at the channel level; (b) ignoring all channels with received signal strength below the signal strength threshold; (c) arranging the channels in order of highest received signal strength to lowest received signal strength and marking the list of channels a prioritized sufficient signal list; (d) selecting a channel with the highest priority on the prioritized sufficient signal list; (e) checking whether communication is available on the selected channel; (f) confirming the selected channel if the second main list including a multi-level system of identifiers is not used; (g) confirming the selected channel if the second main list including the multi-level system of identifiers is used and if the selected level of identifiers in the second main list includes the identifier for the channel; (h) selecting the next channel on the prioritized sufficient signal list, if no channel is confirmed; and (i) repeating the steps (e–h).

BRIEF DESCRIPTION OF THE DRAWINGS

FIG. 1 depicts a hardware state machine implementation of the apparatus of the present invention.

FIG. 2 illustrates a software implementation of the apparatus of the present invention.

FIG. 3 shows a high level flow chart diagram of a method of the present invention applicable for both hardware and software implementation for the apparatus of the present invention.

FIG. 4 depicts a flow chart of a diagram for an example implementation of a level with prioritized channel assignment.

FIG. 5 illustrates a flow chart of a diagram for an example implementation of a level with equal priority channel assignment.

FULL DESCRIPTION OF THE PREFERRED EMBODIMENTS

FIG. 1 depicts a state machine hardware implementation (10) of the apparatus of the present invention.

In the first preferred embodiment of the present invention, the apparatus (10) comprises an internal radio receiver and transmitter circuitry (22), a memory including a channel memory (14) and a identifier memory (18), and a frequency and identification guidance system being implemented using a hardware state machine for channel and identification selection (12).

The channel memory (14) is configured to store a first main list comprising a multi-level priority based system of channels, whose characteristics at each level are independent and configurable by the user. The levels contain channel information, or equivalently frequency entries.

The number of levels within the multi-level priority based system of channels included in the main first list of channel memory (14) is implementation dependent.

In one embodiment, the first main list of channel memory (14 of FIG. 1) includes a plurality of N levels with different priority, wherein N is an integer greater or equal to one.

In one embodiment, the lower the level, the lower the priority of that level. In this embodiment, the highest (first) level including a first plurality of channels has the highest priority and is checked first to achieve the preferred connection. If the preferred connection is achieved, the search is over. However, if the preferred connection is not achieved on any channel belonging to the first plurality of channels included in the first level, the search should continue within the second plurality of channels belonging to the second level.

If the preferred connection is not achieved on any channel belonging to the second plurality of channels included in the second level, each level with the i1-th priority including an i1-th plurality of channels should be consecutively checked to achieve the preferred connection, wherein "i1" is an integer greater than two and less than or equal to N.

In one embodiment, there is an extra lowest level (N+1) including all possible channels within the entire network. If a successful connection is not achieved at any "i1" upper level, then a connection should be possible at the extra lowest level (N+1), since all other possible channels will have been checked. If a successful connection is still not possible at the extra lowest level (N+1), then the signal reception (or transmission) is not available to (or from) any external transceiver of the appropriate network of external radio transceivers for reasons such as insufficient transmission strength or unusually high blockage.

The prior art wireless communication apparatus typically includes only one (extra lowest) level of the present invention.

As was described above, each channel level includes a plurality, channels. That is, within each level, there can be any number of candidate channels, including zero. However, the smaller the number of channels at each level, the quicker will be the response to connecting with the preferred Service Provider, if the successful channel happens to be resident in one of the middle levels.

Referring back to FIG. 1, in addition to the channel information, the identifier memory (18) is configured to store a second main list comprising a multi-level system of identifiers. The multi-level system of identifiers is configured independently from the configuration of the multi-level priority based system of channels. The multi-level system of identifiers provides an additional level of selectivity to ensure the preferred Service Provider is selected. The identification information included in the second main list identifies different entities which are all part of the preferred Service Provider's network. For example, different regions of a network may have different identifiers for one Service Provider. However, all such different regions are acceptable and constitute a part of the same preferred Service Provider's network. In practice, there may be one or many identifiers for a single Service Provider within the entire coverage area for a one particular wireless communication type.

In one embodiment, the second main list further includes a plurality of K identifier levels with different priority, wherein K is an integer greater or equal to one.

In one embodiment, the first highest identifier level is a level with the 1-st highest priority. It includes a first plurality of identifiers and is checked first to identify a preferred network of external radio transceivers.

If identification process is not completed at the first level of identifiers, the next highest level with the 2-nd highest priority including a second plurality of identifiers is checked second to identify a preferred network of external radio transceivers. If identification process is not completed at the second level of identifiers, each level with the i2-th priority including an i2-th plurality of identifiers is consecutively checked to identify a preferred network of external radio transceivers, wherein "i2" is an integer greater than two and less than or equal to K.

It should be emphasized, that the second mail list including a multi-level of identifiers addresses preferences for the particular Service Provider.

In one embodiment, a single level of identifiers with equal priority is sufficient to address preferences for any particular Service Provider.

Referring back to FIG. 1, the apparatus for wireless communication (10) further comprises a communication interface (20) connected to the internal radio receiver and transmitter circuitry (22).

Let us assume, that the internal radio receiver and transmitter circuitry (22) is not initially locked into a frequency channel belonging to (α) Service Provider.

There are two main modes of operation.

In the first mode of operation, the user needs connection fast at any cost. If this is the case, the identifier information (α) provided by the (α) Service Provider is disregarded as soon as the connection on any available channel is established.

Thus, in the first mode of operation, the frequency and identification guidance system (12) is configured to guide the internal radio receiver and transmitter circuitry (22) to any channel, whether belonging to the preferred Service Provider or not.

In the second mode of operation, the user wants to establish communication on the channel belonging to the preferred Service Provider, so the time needed to establish communication is not an issue, the cost of communication is the issue.

If this is the case, the frequency and identification guidance system comprising the hardware state machine (12) goes through the main first list provided by the channel memory (14) to select a channel with the highest priority.

After the connection on the selected channel is established, the microprocessor (16) connected to the communication interface (20) receives the signal strength and the identifier information on the locked channel from an external transceiver belonging to (α) Service Provider via the internal radio receiver and transmitter circuitry (22).

Next, the frequency and identification guidance system comprising the hardware state machine (12) using the identifier information (α) received from (α) Service Provider goes through the main second list provided by the identifier memory (18) to check whether the locked channel belongs to the preferred Service Provider.

If the answer is "no", then the hardware state machine (12) selects a channel having the next priority ID. The radio frequency (RF) channel frequency selector (24) translates the selected channel ID to a preferred physical frequency, and the internal radio receiver and transmitter circuitry (22) locks into the preferred physical frequency. Again, after the connection on the selected channel is established, the microprocessor (16) receives the signal strength and the identifier information on the locked channel from an external transceiver belonging to (α) Service Provider via the internal radio receiver and transmitter circuitry (22).

The whole process is repeated again until the acquired signal with the sufficient signal strength has the identifier that indicates that the selected channel belongs to the preferred Service Provider.

It should be noted, that the same channel can belong to different Service Providers depending on the geographic location of the mobile user.

The complete description of the method of fast signal acquisition on a preferred channel is disclosed below.

The multi-level system of channels is configurable by the user within each level. Specifically, there are many options available to customize the behavior of the frequency and identification guidance system in terms of channels usage and in terms of channels search priority.

In one embodiment, the frequency and identification guidance system (12 of FIG. 1) includes an assignment channel algorithm configured to assign a channel to one channel level or clear a channel from one channel level. The assignment channel algorithm provides the ability to set or store any channel into each priority channel level.

In one embodiment, the frequency and identification guidance system (12 of FIG. 1) includes a clear channel algorithm configured to clear all channels from a single channel level. Thus, the clear channel algorithm, provides the ability to clear all channels for a particular level.

In one embodiment, the frequency and identification guidance system (12 of FIG. 1) includes a global clear channel algorithm configured to clear all channels from the first main list.

As was mentioned above, the multi-level system of channels can be established in many ways. For instance, the upper channel level can be chosen to be a level with the highest priority of channels. This means, that the channels belonging to the upper level of channels should be searched first by the frequency and identification guidance system of the present invention to find a channel with an acceptable signal strength from the preferred Service Provider. However, the multi-level system of channels can be established in other ways too. For instance, the lowest level has the highest priority of channel search and selection.

The channels within each level also have their own priority of search and selection. To this end, in one embodiment of the present invention, the frequency and identification guidance system further includes a static channel selectable algorithm configured to assign a channel priority number to each channel within one channel level.

In one embodiment, the highest priority is set for the first channel entered into a channel level of the first main list, with subsequently lower priorities for subsequent channels entered into the channel level of first main list.

In another embodiment, the highest priority is set in the reverse order, that is the last channel entered into a channel level of the first main list has the highest priority.

Yet, in one more embodiment, all channels within the same channel level of the first main list have equal priority.

Within the levels that are specified with some form of channel priority, the channel priority can be selected to be fixed or static, or dynamically changing, based on some criteria.

In one embodiment, the frequency and identification guidance system further includes a dynamic channel selectable algorithm configured to initially assign a priority number to a channel and configured to automatically reassign a priority number to the channel within one channel level based on some criteria.

In one embodiment, the criteria for automatic change of a channel priority is based on the number of successful connections made to that channel, where the more successful connections is made to that particular channel, the higher priority is assigned to that particular channel.

In another embodiment, the dynamic priority setting is based on the geographical (geo) location information, if this information is available. In this embodiment, the particular channels are set with the highest geo-priority if it is known that the preferred Service Provider predominantly uses the highest geo-priority channels in that particular geographical area.

In one embodiment, clearing out the dynamically assigned channel priority can be done at any time, leaving all channels with the same priority. The automatic priority setting can then restart.

In one embodiment, the frequency and identification guidance system further includes a manually channel setting algorithm, wherein the user manually enters the channels in the channel levels of the first main list.

In another embodiment, the frequency and identification guidance system further includes an automatic channel setting algorithm configured to automatically enter channels at each channel level.

In one embodiment, an automatic channel setting algorithm is based upon a history of channel usage by the apparatus. If this is the case, the channels proceed through a first-in-first-out sequence when the number of different channels in the particular channel level of the first main list exceeds the maximum size of the channel level. That is, the oldest channel in the channel level is removed when a new channel is obtained and the particular channel level is full.

Channel lock and channel unlock capabilities can be set manually or automatically for a particular channel level when the maximum number of channels at that particular channel level of the first main list is filled. This lock and unlock feature is useful if the user finds himself in an area of service where the preferred Service Provider is not likely to provide service, that is a non-preferred Service Provider will be inevitably used. If this is the case, the picked up channels should not be put into the first main list when a level is implemented as entries based on a history of channel usage. By locking the entries into the channel level of the first main list, the user would ensure that the channels used will not get on the first main list.

Referring back to FIG. 1, the identifier memory stores the second main list of a multi-level system of identifiers.

As was mentioned above, the multi-level system of identifiers addresses the preferences for the particular Service Provider.

The multi-level system of identifiers is also configurable by the user.

In one embodiment, the frequency and identification guidance system is configurable by the user and includes an assignment identifier algorithm configured to assign an identifier to an identifier level or clear an identifier from an identifier level.

In one embodiment, the frequency and identification guidance system is configurable by the user and further includes a clear level identifier algorithm configured to clear all identifiers from a single identifier level.

In another embodiment, the frequency and identification guidance system is configurable by the user and further includes a global clear identifier algorithm configured to clear all identifiers from the second main list.

Within the levels that are specified with some form of identifier priority, the identifier priority can be selected to be fixed or static, or dynamically changing, based on some criteria.

In one embodiment, the frequency and identification guidance system further includes a static identifier selectable algorithm configured to assign an identifier priority number to each identifier within one identifier level.

In another embodiment, the frequency and identification guidance system further includes a dynamic identifier selectable algorithm configured to initially assign a priority number to an identifier and configured to automatically reassign a priority number to the initially assigned identifier within the identifier level.

In addition to setting any of the parameters of the multi-level channel structure or the multi-level identifier structure manually or dynamically, the preferred Service provider can selectively change specific parameters at any time a connection is made, by use of special messages in the wireless data stream. This allows to keep the user's device constantly up to date to acquire onto the preferred Service provider channel in the shortest time, at all times.

Prior to usage by the customer, the Service Provider needs to setup an apparatus for wireless communications with configuration parameters and some form of specific identification for that device, such as a specific access code, a telephone number, etc. At this time, the configuration parameters for the above preference structures can be entered. This operation should be done only once, so that the user need not make further adjustments.

However, the sophisticated users have an option to fine tune the adjustments for particular conditions or circumstances.

In addition, changes in the preferred Service Provider's equipment or service can be reflected back into the user device via messages over the wireless link which can change each configuration parameter as described above.

In one embodiment, the wireless messages can be delivered via Internet.

EXAMPLE 2

The frequency multi-level preference structure:
1). 1-st level: Channels that are available at user's home and business areas.
2). 2-nd level: Channels that are available in areas between user's home and business.
3). 3-d level: Channels in neighboring areas of user's home and business.
4). 4-th level: Channels in particular areas where user's business customers operate.
5). 5-th level: Channels in areas of the user's relative residence.
6). 6-th level: History or hot list of previously acquired channels.
7). 7-th level: All other channels in the network.

The Identifiers Preference Structure

Single Level: includes all identifiers for the preferred Service Provider in the entire network.

In one embodiment of the present invention, the multi-level channel system includes two sides: an A side and a B side. The frequency channels fall into either category, but not both. In some locations, one provider may be entirely on the A side and the other provider may be entirely on the B side. If this is the case, a preference setting would place a higher priority for channels on the side on which the service is provided by the preferred Service Provider.

EXAMPLE 3

The setting is A preferred if the provider is a provider A and the provider A has channels only on the A side for a particular area. In some locations, the one provider might have channels on both A and B sides, so the preference setting in this case is not useful.

The hotlist, or history list, takes in channels after a connection is established and puts them into a channel level. Depending on how it is viewed, the channels could be put into more than one channel level. There could be an A-list and a B-list, with each list as a different level in the multi-level system.

I. In those cases where we have an A preferred channel setting, for a simplified implementation where we only have a history list and "all the channels" list, the multi-level channel priority system is as follows:
1). A-side channels in the hotlist (top level priority).
2). A-side channels in the "all the channels" list.
3). B-side channels in the hotlist.
4). B-side channels in the "all the channels" list (the lowest level priority).

Thus, we have a 4-level prioritized system where the 1-st and the 3-d level channels are entered automatically.

II. For a B-side preference, the multi-level channel priority system is:
1). B-side channels in the hotlist (top level priority).
2). B-side channels in the "all the channels" list.
3). A-side channels in the hotlist.
4). A-side channels in the "all the channels" list (the lowest level priority).

III. For an A-only preference, the multi-level channel priority system is:
1). A-side channels in the hotlist (top level priority).
2). A-side channels in the "all the channels" list (the lowest level priority).

Here we have only a 2-level prioritized system where only the 1-st level channels are entered automatically.

IV. For a B-only preference, the priority of the multi-level system of channels is as follows:
1). B-side channels in the hotlist (top level priority).
2). B-side channels in the "all the channels" list (the lowest level priority).

These 4 embodiments show the dynamic nature of the priority of the levels and even the number of levels in the multi-level system of channels based on only one parameter for the user, that is the side preference.

V. For a No-Preference case, the priority is:
1). A-side and B-side channels in the hotlist (top level priority).
2). A-side and B-side channels in the "all the channels" list (lowest level priority).

In the second preferred embodiment of the present invention, as depicted in FIG. 2, the apparatus of the present invention (50) includes a frequency and identification guidance system further comprising a microprocessor (52) and a microprocessor memory (54). This is a software implementation of the frequency and identification guidance system of the present invention.

The communication interface (20), the internal radio receiver and transmitter circuitry (22), and the RF channel frequency selector (24) function in the same way as in the hardware implementation (10 of FIG. 1) of the present invention, which was disclosed above.

However, in the software implementation (50 of FIG. 2) of the present invention, the microprocessor (52) goes through the main first list provided by the channel memory (14) and goes through the main second list provided by the identifier memory (18) in order to select a preferred channel ID corresponding to a preferred frequency channel.

In the third preferred embodiment of the present invention (not shown), the apparatus of the present invention includes a frequency and identification guidance system that is implemented using a hardware implementation for the frequency part and utilizing a software implementation for the identification part.

In this embodiment, the state machine goes through the main first list provided by the channel memory, and the microprocessor goes through the main second list provided by the identifier memory in order to select a preferred channel ID corresponding to a preferred frequency channel.

In the fourth preferred embodiment of the present invention (not shown), the apparatus of the present invention includes a frequency and identification guidance system that is implemented using a software implementation for the frequency part and utilizing a hardware implementation for the identification part.

In this embodiment, the microprocessor goes through the main first list provided by the channel memory, and the state machine goes through the main second list provided by the identifier memory in order to select a preferred channel ID corresponding to a preferred frequency channel.

Another aspect of the present invention is directed to a method of fast signal acquisition on a preferred wireless frequency channel by a wireless communication apparatus (10 of FIG. 1).

In one embodiment, the method of the present invention comprises the following steps: (1) configuring the frequency and identification guidance system; and (2) selecting the preferred wireless frequency channel provided by at least one radio transceiver by utilizing the frequency and identification guidance system, the radio transceiver is a part of a plurality of networks of external radio transceivers.

In one embodiment, the step of configuring the frequency and identification guidance system further includes the steps of storing a multi-level system of channels in a first main list of the memory, and storing a multi-level system of identifiers in a second main list of the memory.

In one embodiment of the present invention, as depicted in FIG. 3, a high level flow chart diagram (60) (applicable for only a hardware, for only a software, and for a mixed hardware /software implementation of the frequency and identification guidance system) includes the following steps.

At first, (step 64), the frequency and identification guidance system selects a highest priority level in the multi-level system of identifiers. Next, (step 66), a channel level with the 1-st highest priority including a first plurality of channels is checked to achieve the preferred connection.

If a preferred connection is not achieved (step 66), the frequency and identification guidance system checks a channel level with the 2-nd highest priority including a second plurality of channels (step 68) to achieve a preferred connection.

Again, if a preferred connection is not achieved, (step 68), the frequency and identification guidance system (steps 70–72) checks consecutively each channel level with the "i3"-th priority including an "i3"-th plurality of channels to achieve preferred connection, wherein "i3" is an integer greater than two and less than or equal to N. If the preferred connection has not still been achieved, the frequency and identification guidance system selects the next highest priority level in the multi-level system of identifiers (step 74), and the steps (66–74) are repeated again.

The step of selecting the preferred wireless frequency channel (not shown) further includes the steps of: (a) checking an identifier level with the 1-st highest priority including a first plurality of identifiers to identify a preferred network of external radio transceivers; (b) if a preferred connection is not achieved in the step (a),checking an identifier level with the 2-nd highest priority including a second plurality of identifiers to identify a preferred network of external radio transceivers; and (c) if a preferred connection is not achieved in the step (b), checking consecutively each level with the "i4"-th priority including an "i4"-th plurality of identifiers to identify a preferred network of external radio transceivers, wherein "i4" is an integer greater than two and less than or equal to K.

FIG. 4 depicts a flow chart (80) of a diagram for an example implementation of a level with prioritized channel assignment.

In this embodiment, the step of checking the channel level if a preferred connection is not achieved in the preceding channel level further comprises the following steps: (82) arranging at the channel level with the next highest priority a plurality of channels in order of highest channel priority to lowest channel priority and marking the arrangement of channels as a prioritized channel list; (84) selecting a channel with the highest channel priority on the prioritized channel list; (86) checking whether the strength of the received signal on the selected channel is above a threshold; (88) checking whether communication is available on the selected channel; (90) confirming the selected channel if the second main list including a multi-level system of identifiers is not used; (92) confirming the selected channel if the second main list including the multi-level system of identifiers is used and if the selected level of identifiers in the second main list includes the identifier provided by a network of external radio transceivers during the communication step (88); if a channel is not confirmed, selecting in the next step (98) a channel with the next highest channel priority on the prioritized channel list; and repeating the steps (86–98).

FIG. 5 illustrates a flow chart (100) of a diagram for an example implementation of a level with equal priority channel assignment.

In this embodiment, all channels within the same channel level have the same channel priority.

The step of checking the channel level if a preferred connection is not achieved at the preceding channel level further comprises the following steps: (102) checking whether the received signal strength is above a signal strength threshold for all channels at the channel level; (104) ignoring all channels with received signal strength below the signal strength threshold; (106) arranging the channels in order of highest received signal strength to lowest received signal strength and marking the list of channels a prioritized sufficient signal list; (108) selecting a channel with the highest priority on the prioritized sufficient signal list; (110) checking whether communication is available on the selected channel; (112) confirming the selected channel if the second main list including a multilevel system of identifiers is not used; (114) confirming the selected channel if the second main list including the multi-level system of identifiers is used and if the selected level of identifiers in the second main list includes the identifier for the selected channel; if a channel is not confirmed, selecting in the next step (120) the next channel on the prioritized sufficient signal list; and repeating the steps (110–120).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of fast signal acquisition on a preferred wireless frequency channel by a wireless communication apparatus said wireless communication apparatus including a memory and a frequency and identification guidance system, said method comprising the steps of:

(A) configuring said frequency and identification guidance system by:
  (A1) storing a multi-level system of channels in a first main list of said memory; and
  (A2) storing a multi-level system of identifiers in a second main list of said memory; and
(B) selecting said preferred wireless frequency channel provided by at least one radio transceiver by utilizing said frequency and identification guidance system, said one radio transceiver being a part of a plurality of networks of external radio transceivers,
  (B1) selecting a highest priority level in said multi-level system of identifiers;
  (B2) checking a channel level with the 1-st highest priority including a first plurality of channels to achieve the preferred connection:
  (B3) if a preferred connection is not achieved in the step (B2), checking a channel level with the 2-nd highest priority including a second plurality of channels to achieve preferred connection:
  (B4) if a preferred connection is not achieved in the step (B3), checking consecutively each channel level with the i3-th priority including an i3-th plurality of channels to achieve preferred connection, i3 being an integer greater than two and less than or equal to N, wherein said first main list includes a plurality of N levels with different priority wherein N is an integer greater or equal to one;
  (B5) selecting the next highest priority level in said multi-level system of identifiers, if a connection is not achieved; and
  (B6) repeating said steps (B2–B5) until said preferred connection is achieved, wherein the step of checking the channel level with the next highest priority if a preferred connection is not achieved in the preceding step, further comprises the steps of:
    (a) arranging at said channel level with the next highest priority a plurality of channels in order of highest channel priority to lowest channel priority and marking said arrangement of channels as a prioritized channel list;
    (b) selecting a channel with the highest channel priority on said prioritized channel list;
    (c) checking whether the strength of the received signal on said selected channel is above a threshold;
    (d) checking whether communication is available on said selected channel;
    (e) confirming said selected channel if the second main list including a multi-level system of identifiers is not used;
    (f) confirming said selecting channel if the second main list including said multi-level system of identifiers is used and if said selected level of identifiers in said second main list includes the identifier provided by a network of external radio transceivers during the communication step (d);
    (g) selecting a channel with the next highest channel priority on said prioritized channel list, if said selected channel is not confirmed; and
    (h) repeating said steps (c–g).

* * * * *